US007248144B2

(12) United States Patent
Rodriguez

(10) Patent No.: US 7,248,144 B2
(45) Date of Patent: Jul. 24, 2007

(54) BARRIER OPERATOR WITH SECURE/UNSECURE TRANSMITTER AND METHOD OF USE

(75) Inventor: Yan Rodriguez, Suwanee, GA (US)

(73) Assignee: Wayne-Dalton Corp., Mt. Hope, OH (US)

( * ) Notice: Subject to any disclaimer, the term of this patent is extended or adjusted under 35 U.S.C. 154(b) by 307 days.

(21) Appl. No.: 10/938,214

(22) Filed: Sep. 10, 2004

(65) Prior Publication Data

US 2006/0055511 A1 Mar. 16, 2006

(51) Int. Cl.
*H04Q 9/00* (2006.01)
*G08C 19/00* (2006.01)

(52) U.S. Cl. ............... 340/5.71; 340/5.72; 340/825.69; 340/825.71; 340/825.72

(58) Field of Classification Search ............... 340/5.71, 340/5.72, 825.69, 825.71, 825.72
See application file for complete search history.

(56) References Cited

U.S. PATENT DOCUMENTS

| | | | | |
|---|---|---|---|---|
| 4,808,995 | A | 2/1989 | Clark et al. | 340/825.69 |
| 4,847,542 | A | 7/1989 | Clark et al. | 318/560 |
| 4,912,463 | A | 3/1990 | Li | 340/825.69 |
| 4,929,877 | A | 5/1990 | Clark et al. | 318/560 |
| 5,252,960 | A | 10/1993 | Duhame | 340/825.56 |
| 5,442,340 | A | 8/1995 | Dykema | 340/825.22 |
| 5,481,256 | A * | 1/1996 | Darbee et al. | 340/825.72 |
| 5,564,101 | A | 10/1996 | Eisfeld et al. | 455/352 |
| 5,576,701 | A | 11/1996 | Heitschel et al. | 340/825.31 |
| D380,696 | S * | 7/1997 | Doppelt et al. | D10/104 |
| 5,661,804 | A | 8/1997 | Dykema et al. | 380/21 |
| 5,940,007 | A * | 8/1999 | Brinkmeyer et al. | 340/825.69 |
| 5,955,981 | A * | 9/1999 | Rangan | 340/5.72 |
| 6,091,343 | A | 7/2000 | Dykema et al. | 340/825.69 |
| 6,181,255 | B1 | 1/2001 | Crimmins et al. | 340/825.69 |
| 6,326,754 | B1 | 12/2001 | Mullet et al. | 318/480 |
| 6,414,587 | B1 | 7/2002 | Fitzgibbon | 340/5.22 |
| 6,486,795 | B1 * | 11/2002 | Sobel et al. | 340/825.69 |
| 6,567,012 | B1 * | 5/2003 | Matsubara et al. | 340/825.72 |
| D490,380 | S * | 5/2004 | Coullahan et al. | D13/168 |

(Continued)

FOREIGN PATENT DOCUMENTS

DE 100 32 915 A1 1/2002

(Continued)

OTHER PUBLICATIONS

Bargain Enterprises, "Garage Door Parts" section of web site www.new-garage-door-parts.com/chamberlain-liftmaster-radio.html . . . p. 3. published at least as early as 2002.

*Primary Examiner*—Jeffery Hofsass
*Assistant Examiner*—Scott Au
(74) *Attorney, Agent, or Firm*—Renner, Kenner, Greive, Bobak, Taylor & Weber

(57) ABSTRACT

A wireless transmitter used with an operator system controls movement of a barrier between limit positions can be used in an unsecure, single-button actuation mode, or a secure, multiple button actuation mode. The transmitter includes at least two transmitter switches, and a controller connected to the switches. The controller has a first mode of operation, wherein actuation of a single one of the switches generates a wireless signal receivable by the operator system, and a second mode of operation, wherein actuation of the switches in a predetermined sequence generates the wireless signal.

16 Claims, 5 Drawing Sheets

U.S. PATENT DOCUMENTS

| | | | | |
|---|---|---|---|---|
| 7,015,791 | B2 * | 3/2006 | Huntzicker | 340/825.69 |
| 2002/0014954 | A1 | 2/2002 | Fitzgibbon et al. | 340/5.64 |
| 2002/0053975 | A1 | 5/2002 | Fitzgibbon et al. | 340/541 |
| 2002/0163440 | A1 * | 11/2002 | Tsui | 340/825.69 |
| 2003/0231131 | A1 * | 12/2003 | Dimig et al. | 340/5.72 |

FOREIGN PATENT DOCUMENTS

| | | |
|---|---|---|
| GB | 2 241 680 A | 9/1991 |
| WO | WO 92/10630 | 6/1992 |
| WO | WO 95/15663 A | 6/1995 |

* cited by examiner

BARRIER OPERATOR WITH SECURE/UNSECURE TRANSMITTER AND METHOD OF USE

TECHNICAL FIELD

Generally, the present invention relates to a garage door operator system for use on a closure member moveable relative to a fixed member. More particularly, the present invention relates to an operator system that is operative with a remote transmitter that transmits signals in either a secure mode or an unsecure mode. Specifically, the present invention relates to a remote transmitter that activates an operator system with a single button actuation in an unsecure mode or activates the operator system with a sequence of button actuations in a secure mode.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. It is also known to provide safety devices that are connected to the operator for the purpose of detecting an obstruction so that the operator may then take corrective action with the motor to avoid entrapment of the obstruction.

There are three basic types of transmitters that can be used to instruct an operator to initiate a desired action. A portable or remote transmitter is usually kept in the user's vehicle and allows the user to open and close the door from inside the vehicle. The portable transmitter may have several buttons, wherein each button is associated with operation of a different door. A wall station transmitter is usually mounted near an interior door of the garage and allows the user to open and close the garage door as needed. The wall station may include function buttons to allow programming of the operator, delay closing of the door, setting of a pet height and other functions. The other type of transmitter is a keypad, which is typically mounted outside the garage, that requires manual entry of a code prior to sending an open/close signal. These remote devices may also be provided with additional features such as the ability to control multiple doors, lights associated with the doors, and other security features.

In order for a transmitter device to work with an operator to control movement of the garage door, the operator must be programmed to learn the particular serial number code for each transmitter. In the past, radio controls utilized a code setable switch, such as a ten-circuit DIP switch to set the data for both the transmitter and the receiver. Both the transmitter and the receiver's code switch must match for the transmitter to activate the receiver's output. This method did not allow for enough unique codes and was relatively easy for someone to copy the code and gain improper access. Accordingly, this process required the setting of transmitter and receiver codes physically switched to identical settings for operation of the garage door.

Presently, most radio controls for garage doors use either a fixed code format wherein the same data for each transmission is sent, or a rolling-code format, wherein some or all of the data changes for each transmission. A fixed code transmitter, also known as a fixed address or a fixed serial number transmitter, is assigned and factory programmed into a transmitter's non-volatile memory during the manufacturing of the product. A receiver is designed to "learn" a transmitter's code and the transmitter's code is stored in the receiver's non-volatile memory. This increased the number of possible codes (from 1024 or 19,683 to millions) and eliminated the DIP switch. This also prevented the code from being visible, as is the case with the DIP switch transmitter, thus preventing theft of the code.

A rolling code transmitter is similar to a fixed code transmitter, but at least a portion of the address, also known as the code or serial number, is changed with every operation of the transmitter. The transmitter and the corresponding receiving unit use an algorithm to determine what the next code to transmit/receive shall be. Only the proper code will activate the receiver.

The use of the portable or remote transmitter is problematic inasmuch as it provides ready access to a home or business if the remote transmitter falls into the wrong hands. For example, an opportunistic thief may steal just the remote transmitter from an automobile, and knowing where that person lives can, at a time when the home or business owner is absent, use the remote transmitter to enter the site and perform whatever mischief. The only known solution to this problem is to clear all transmitter codes from the operator and then re-learn the transmitters so that different codes activate the operator and move the barrier. This is time consuming and, if not done properly, still may allow the stolen transmitter to be used with the operator. Therefore, there is a need in the art to provide a remote transmitter that allows for use in an unsecure, single button actuation mode, or a secure, multiple button actuation mode.

DISCLOSURE OF THE INVENTION

In general, the present invention contemplates a barrier operator with a secure/unsecure transmitter and method of use.

One of the aspects of the present invention, which shall become apparent as the detailed description proceeds, is achieved by a wireless transmitter used with an operator system that controls movement of a barrier between limit positions, the transmitter comprising: at least two transmitter switches; and a controller connected to the switches; the controller having a first mode of operation, wherein actuation of a single one of the switches generates a wireless signal receivable by the operator system; and the controller having a second mode of operation, wherein actuation of the switches in a predetermined sequence generates aid wireless signal.

Another aspect of the present invention is attained by a method for transmitting wireless signals from a transmitter to an operating system that moves a barrier between limit positions, comprising: providing in the transmitter a controller capable of generating a wireless transmission signal; designating one of two transmission modes in the controller, wherein a first mode requires only actuation of one of the switches and wherein a second mode requires actuation of the switches in a predetermined sequence.

Still another aspect of the present invention is attained by a method of programming a multiple-button wireless transmitter that actuates movement of a barrier between limit positions, comprising: in an unsecured mode initiates a function controlled by a moveable barrier operator with a single button actuation, the method comprising: actuating at least two buttons of the transmitter simultaneously for a predetermined period of time; releasing the actuated buttons; an actuating separately at least two buttons of the transmitter in a sequence and one of the at least two buttons to terminate the sequence.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
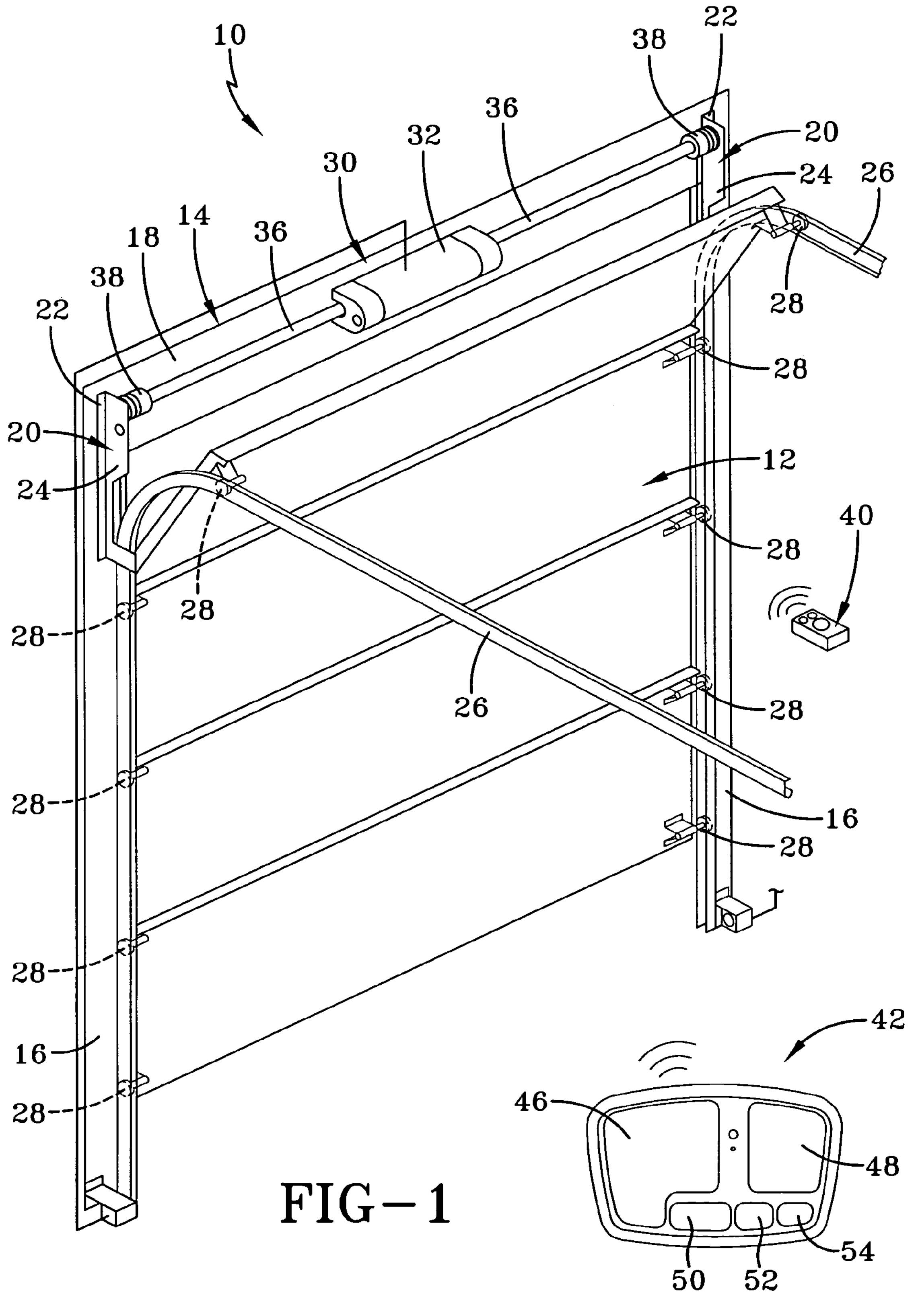
FIG. 1 is a perspective view depicting a sectional garage door and showing an operating mechanism embodying the concepts of the present invention.

A garage door operator system which incorporates the concepts of the present invention is generally indicated by the numeral 10 in FIG. 1 of the drawings. The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 and a motor 35 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is specifically discussed herein, the control features to be discussed later are applicable to other types of operators used with movable barriers.

The drive shaft 36 transmits the necessary mechanical power to transfer the garage door 12 between closed and open positions. In the housing 32, the drive shaft 36 is coupled to a drive gear wherein the drive gear is coupled to the motor 35 in a manner well known in the art.

Figure 2:
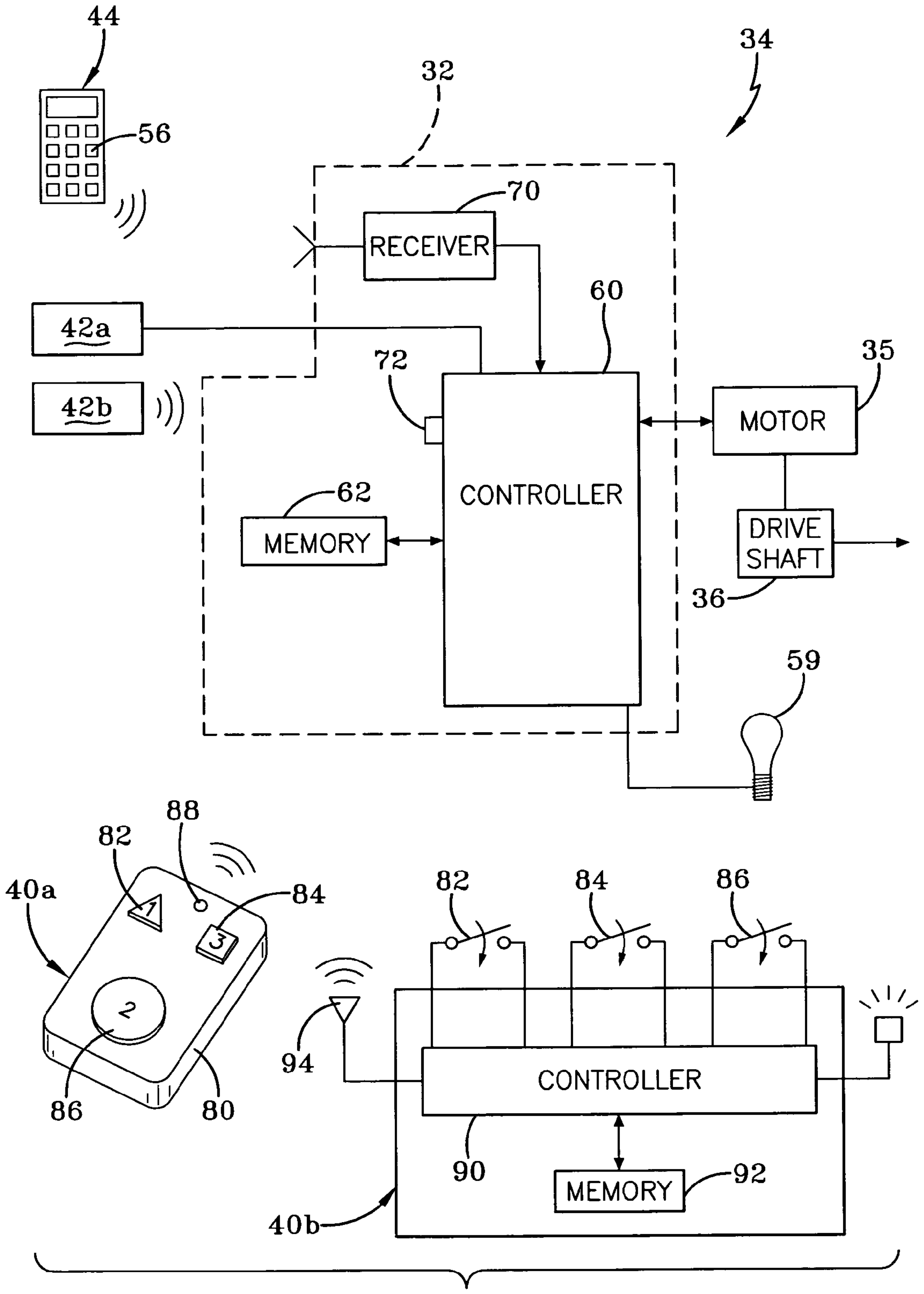
FIG. 2 is a block drawing of an operator and a remote transmitter according to the present invention.

Referring now to FIGS. 1 and 2, the counter-balancing system 30 may be controlled by a wireless remote transmitter 40; a wall station control 42 that is wired directly to the system 30 or which may communicate via radio frequency or infrared signals; and a keypad transmitter 44. The wall station control 42 is likely to have additional operational features not present in the portable transmitter 40. These features, in addition to an up/down button 46, include a light on/off button 48 to operate a light 59, a time delay close button 50, a pet height button 52, and a transmitter programming button 54. The keypad transmitter 44 includes alphanumeric keys 56 which must be actuated in a predetermined sequence to open or close the door/barrier. All three transmitting devices, at a minimum, are able to initiate opening and closing movements of the door coupled to the system 30. And although the present invention is described in the context of a sectional garage door, the teachings of the invention are equally applicable to other types of movable barriers such as single panel doors, gates, windows, retractable overhangs and any device that at least partially encloses an area.

The operator mechanism, which is designated generally by the numeral 34 in FIG. 2, is contained within the housing 32 and monitors operation of the motor and various other elements connected to the operator mechanism 34 as will be described herein below. A power source (not shown) is used to energize the foregoing elements. The operator mechanism 34 includes a controller 60 which incorporates the necessary software, hardware and memory storage devices for controlling the operation of the operator mechanism 34. In electrical communication with the controller 60 is a non-volatile memory device 62 for permanently storing information utilized by the controller in conjunction with the operation of the operator mechanism 34. Of course, the memory device 62 may be internally incorporated within the controller 60.

Infrared and/or radio frequency signals emitted by the transmitters are received by a receiver 70 which sends the received information to a decoder contained within the controller. The codes emitted from the transmitters have a serial number that is recognized by the controller. Each type of transmitter has a pre-designated range of serial numbers that are distinguishable by the controller. In other words, the controller is able to determine whether a transmission is from a keypad, a wall station or a portable transmitter. In any event, the controller 60 converts the received radio frequency signals or other types of wireless signals into a usable format. It will be appreciated that an appropriate antenna is utilized by the receiver 70 for receiving the desired signals. It will also be appreciated that the controller 60 is capable of directly receiving transmission type signals from a direct wire source as evidenced by the direct connection to the wall station 42*a*. A skilled artisan will appreciate that a wall station 42 (or keypad 44) is either hard-wired to the operator 34 or emits an RF signal. In the preferred embodiment, the wall station is either hard-wired or wireless, but not both. Since a hard-wired device sends a signal directly to the controller there is no need to store that device's serial number in the memory device. Accordingly, only serial numbers from wireless devices are learned by the operator and stored in the memory device 62. Any number of remote transmitters 40_a-x_ can transmit a signal that is received by the receiver 70 and further processed by the controller 60 as needed. Likewise, there can be any number of wall stations 42_b-x_, and keypads 44. If the signals received from any one of the transmitting devices are acceptable and stored in the memory device 62, the controller 60 generates the appropriate electrical signals for performing the desired function, such as energizing the motor 35 which in turn rotates the drive shaft 36 and opens and/or closes the movable barrier. A light 59, which may be turned on and off independently or whenever an open/close cycle is initiated, is also connected to the controller 60.

As best seen in FIG. 2, the operator system 34 may be responsive to multiple remote transmitters. The remote transmitter designated as 40_a_ provides an external view of the remote while the remote transmitter designated generally by the numeral 40_b_ illustrates the internal components of an exemplary remote transmitter. The remote transmitter 40_a_ provides a housing 80 from which extend three switches or buttons 82, 84 and 86. The housing 80 also provides a light emitting diode (LED) 88 may be used to indicate various programming modes and confirmation of actuation of the buttons 82-86. If desired, the buttons 82-86 may be distinguishable by shape, wherein the button 82 is a triangle shape, the button 84 is a square shape, and the button 86 is a circle shape. In the alternative, or in combination with the shapes, the buttons may be provided with alphanumeric indicia.

The remote transmitter 40 includes a transmitter controller 90 which provides the necessary hardware, software and memory for implementing the concepts of the present invention. A memory device 92 may be directly connected to the controller 90 or, in the alternative, the memory 92 may be internally incorporated with the controller 90. Extending from the controller 90 is an antenna 94 which is utilized to transmit wireless signals. In the preferred embodiment, the transmitter emits radio frequency signals, although it will be appreciated that infrared, acoustic or other wireless type signals may be generated by the transmitter as long as they are receivable by the operator system 32. It will also be appreciated that the controller 90 and all internal components of the remote transmitter are powered by a battery (not shown) in a manner well known in the art.

The transmitter 40 provides two modes of transmitting signals to the operator. In the first mode, the portable transmitter 40 functions as a one button "unsecure" transmitter. In other words, any one of the different buttons 82-86 may be individually actuated so as to send a particular functional signal to the operator 34. Accordingly, the larger button 86 may be used to primarily actuate movement of a preferred or main barrier, while the button 82 may be used to individually or separately actuate the light 59. The other button 84 may be used to actuate a secondary operator system such as a community managed gate opener or an opener that is not commonly used by the person possessing the remote transmitter 40. The functions associated with actuation of the various buttons may be re-programmed as deemed appropriate. It will be appreciated that the unsecure mode is the standard mode of the remote transmitter as shipped by the manufacturer.

The "unsecure" mode may be converted or changed to a "secure" mode such that the functional operation of the transmitter is significantly changed. As will be described in further detail, the transmitter 40 only emits a radio frequency signal upon completion or actuation of the buttons 84-86 in a predetermined manner. In other words, the remote transmitter 40 is enabled to function like a keypad transmitter inasmuch as a specific sequence of buttons must be actuated prior to the sending of a radio frequency signal.

Figure 3:
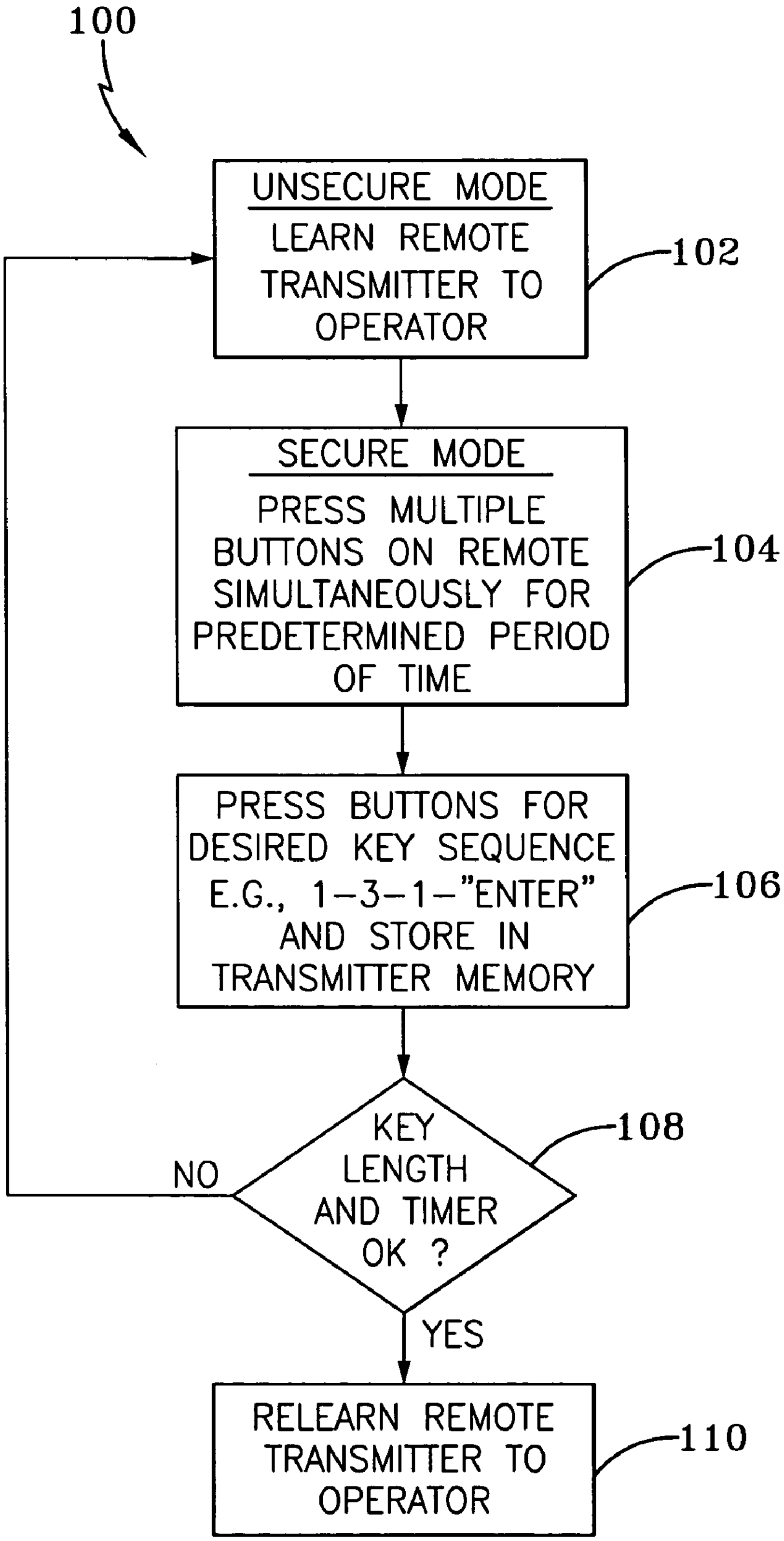
FIG. 3 is an operational flow chart employed by the operator for programming secure transmitter codes for a remote transmitter.

Referring now to FIG. 3, a method for converting and programming the remote transmitter from an unsecure mode to a secure mode is designated generally by the numeral 100. Initially, the transmitter is provided in an unsecure mode and may be learned to the operator at step 102. It will be appreciated; however, that the remote transmitter does not need to initially be learned to the operator in the normal unsecure mode and that the transmitter may be immediately converted to a secure transmitter upon receipt from the factory or the installer. In any event, at step 104, the secure mode of the remote transmitter is entered by pressing multiple buttons on the remote transmitter simultaneously for a predetermined period of time. Accordingly, at least two buttons must be pressed to enter the secure mode and preferably all buttons 82-86 provided on the transmitter are pressed simultaneously to enter the initial phase of the secure mode programming operation and start a timer. Some indication may be provided by the remote transmitter that the programming mode has been entered such as continued illumination of the LED 88. Upon confirmation of entry into the programming mode, at step 106, the user may press the buttons desired for the predetermined sequence, which may also be referred to as the key code. For example, the user may actuate buttons 82, 84, 82 and then use the larger button 86 as the enter button and as such this code (1-3-1 or triangle, square, triangle) is stored in the transmitter's memory 92. The controller, at step 108, confirms the length of the predetermined sequence and, if the sequence is entered in a predetermined period of time from when the timer was initiated, the process proceeds to step 110. The operator is then placed in the learn mode and the buttons are actuated according to the key code and the radio frequency code associated with that particular key code sequence is learned to the operator. If, however, at step 108, a problem is detected in the key length or the timer expires prior to completion of the keying sequence, then the process returns to step 102. It will be appreciated that in step 106 the enter key may be any one of the designated keys, but preferably the larger key is used so that finality is provided to the keying sequence. Any number of button actuations may be used for a key code sequence, but preferably not too few so as to prevent unauthorized users from simply guessing the code and preferably not too many button actuations so as to allow for memorization of the sequence code. Illumination of the LED 88 in a predetermined manner upon confirmation of learning the remote transmitter to the operator may be provided.

Figure 4:
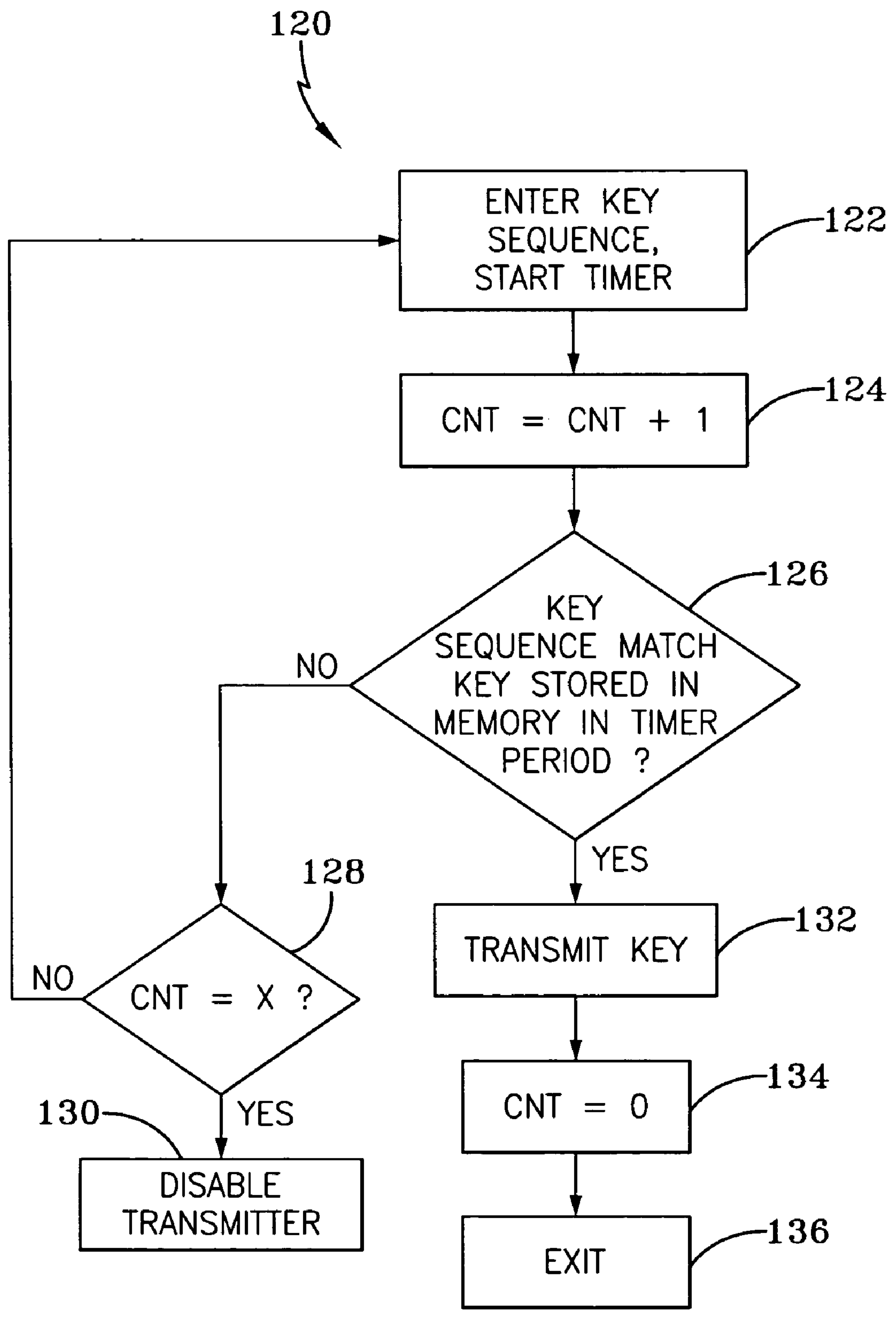
FIG. 4 is an operational flow chart employed by the operator for using a remote transmitter in a secure mode.

Referring now to FIG. 4, the methodology for using the remote transmitter in a secure mode is designated generally by the numeral 120. At step 122, the user enters the key sequence and timer is initiated at the first button actuation. At step 124 a counter is incremented or decremented as deemed appropriate, and then at step 126 the controller 90 validates the entered key code sequence to confirm it matches a code stored in memory. The controller also determines whether the entered key code sequence has been entered within a predetermined period of time. If either the key sequence has not been properly entered or has not been entered in the predetermined period of time, the process continues to step 128 to determine whether the counter is at a predetermined number. If the count has reached a predetermined level, such as 15, then at step 130, the transmitter is disabled and the process is exited. If this occurs then the user must re-learn the remote transmitter to the. This feature is desirable in the event an unauthorized person attempts to guess the transmitter's key code.

If at step 128 the count is not equal to the number of attempts allowed, then the process returns to step 122 for repeating of steps 124 and 126. If at step 126 the key sequence does match a key code sequence stored in memory, then at step 132, the radio frequency code to initiate function of the operator system is transmitted to the operator. After this, the counter is reset to a predetermined starting value at step 134 and then at step 136 the use sequence is exited.

Figure 5:
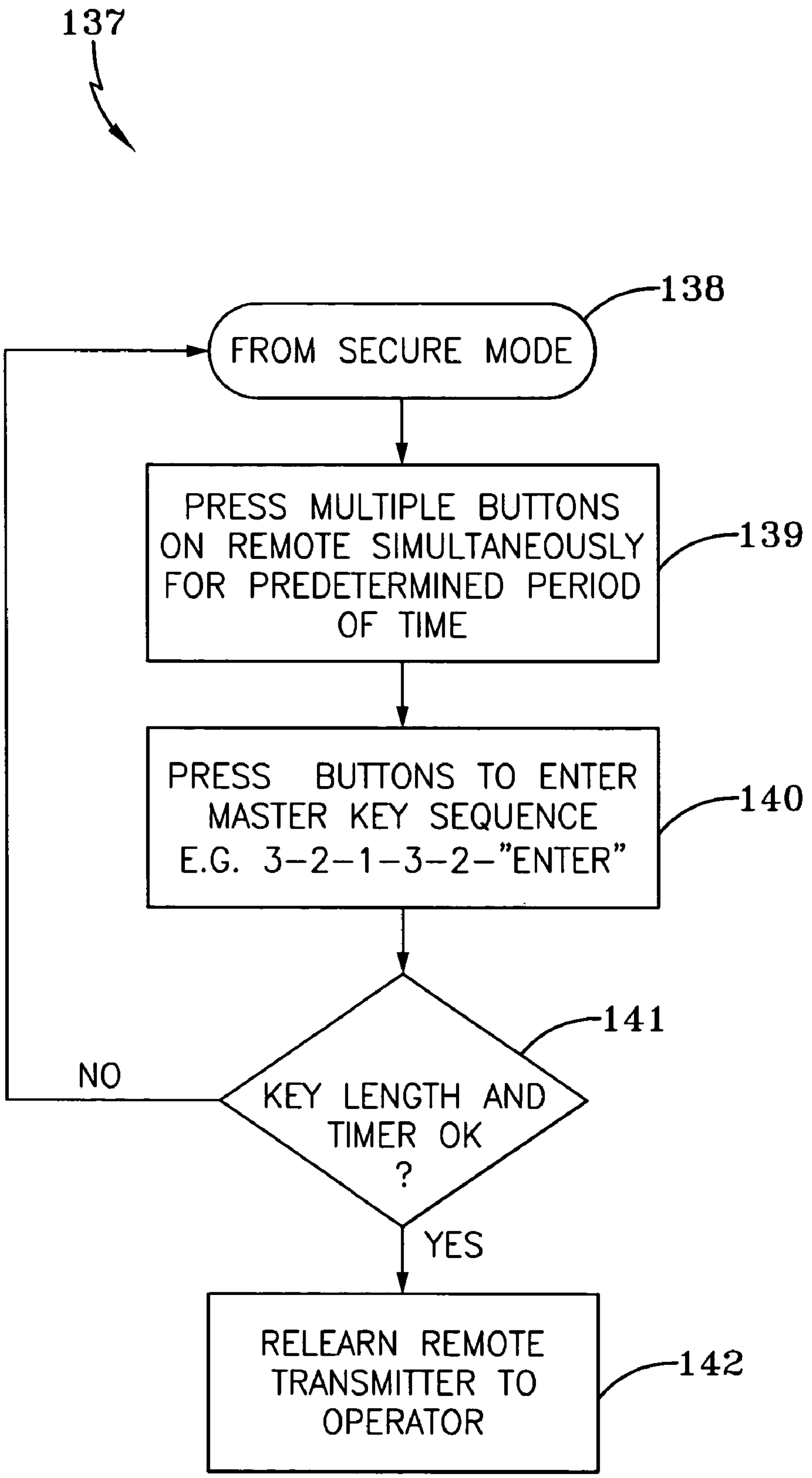
FIG. 5 is an operational flow chart employed by the operator for re-programming a secure transmitter to be an unsecure transmitter.

Referring now to FIG. 5, the methodology for returning a remote transmitter from a secure mode to an unsecured mode is designated generally by the numeral 137. At step 138 the user begins with a secure transmitter obtained using steps 102-110. At step 139 the unsecured mode of the remote transmitter is entered by pressing multiple buttons on the remote transmitter simultaneously for a predetermined period of time. Accordingly, at least two buttons must be pressed to enter the unsecured mode and preferably all buttons 82-86. Pressing buttons 82-86 provided on the transmitter are pressed simultaneously to enter the initial phase of the secure mode programming operation and start a timer. Some indication may be provided by the remote transmitter that the programming mode has been entered such as continued illumination of the LED 88. Upon confirmation of entry into the programming mode, at step 140, the user must press a factory pre-programmed code referred to as the master key sequence. For example, the master key sequence may require the user to actuate buttons 82, 82, 84 and then use the larger button 86 as the enter button and as such this code (1-1-3 or triangle, triangle, square) is entered. The controller, at step 141, confirms the length and value of the master key sequence and, if the sequence is entered properly and in a predetermined period of time from when the timer was initiated, the process proceeds to step 142. The operator is then placed in the learn mode and a single button actuation from the remote transmitter will enable the opener to learn the codes associated with the button press and transmitter. If however at step 141, a problem is detected in the key code, length, or the timer expires prior to completion of the keying sequence, then the process returns to step 138.

Based upon the foregoing, it is readily apparent that the above-described system and remote transmitter and related method of use is advantageous inasmuch as the remote transmitter is modifiable and can be used in a secure mode. Accordingly, the user is provided with a high level of confidence that if the transmitter falls into the wrong hands, it cannot be used to access a residence or place of business. And, if a remote transmitter is lost there is not an immediate need to replace all the remote transmitters or require that all the remote transmitters be reprogrammed to the operator system. Such a configuration is also advantageous in that the remote transmitter is useable in either an unsecured or secured mode depending upon the wishes of the end user. This reduces the number of remote transmitters that need to be manufactured. The disclosed remote transmitter is also advantageous in that it can be switched back to an unsecure mode by following the steps outlined in the description above and using only a single button key code.

Thus, it can be seen that one or more of the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. In combination, a wireless transmitter and an operator system that controls movement of a barrier between limit positions, the combination comprising:

an operator system that controls movement of a barrier between limit positions, said operator system having an operator controller that receives wireless signals; and a transmitter comprising:

at least two transmitter switches; and a transmitter controller connected to said switches, said transmitter controller emitting a serial number in a wireless signal that is programmed by a user to said operator controller to initiate movement of the barrier;

said transmitter controller having an unsecure mode of operation and a secure mode of operation either of which initiates movement of the barrier between limit positions, wherein said transmitter controller sends said wireless signal containing said serial number either in said unsecure mode upon actuation of a single one of said switches, or in said secure mode upon actuation of said switches in a predetermined sequence.

2. The combination according to claim 1, further comprising:

a housing which carries said transmitter switches and said transmitter controller, and a single button associated with each of said corresponding switches and carried by said housing.

3. The combination according to claim 2, wherein each said button has a unique indicia marking.

4. The combination according to claim 2, wherein each said button has a unique shape.

5. The combination according to claim 1, wherein said secure mode is enabled by selectively actuating said transmitter switches and then selectively actuating said transmitter switches in said predetermined sequence within a predetermined period of time.

6. The combination according to claim 5, wherein said predetermined sequence always concludes with actuation of a selected one of said transmitter switches.

7. The combination according to claim 5, wherein said secure mode is disabled by entering a factory defined master key sequence which switches the transmitter from said secure mode to said unsecure mode.

8. A method for transmitting wireless signals from a transmitter to an operating system that moves a barrier between limit positions, comprising:

providing a barrier operator system that controls movement of a barrier between limit positions:

providing in the transmitter a controller generating a wireless transmission signal upon actuation of at least one switch;

including in said wireless transmission signal a serial number;

learning said serial number to said barrier operator; and receiving said wireless transmission signal with said serial number in said barrier operator; and designating one of two transmission modes in said controller, wherein an unsecure mode requires only actuation of one of said transmitter's switches to send said wireless transmission signal with said serial number, and wherein a second secure mode requires actuation of said transmitter's switches in a predetermined sequence to send said wireless transmission signal with said serial number.

9. The method according to claim 8, further comprising:

enabling said secure mode by requiring actuation of at least two of said transmitter's switches for a predetermined period of time.

10. The method according to claim 9, further comprising:

distinguishing said at least two transmitter switches with indicia.

11. The method according to claim 9, further comprising:

distinguishing said at least two transmitter switches by shape.

12. The method according to claim 9, further comprising:

distinguishing said at least two transmitter switches by shape and indicia.

13. The method according to claim 9, further comprising, disabling said secure mode by requiring actuation of at least two of said transmitter switches for another predetermined period of time.

14. The method according to claim 13, further comprising entering a pre-designated sequence of said transmitter switches within yet another predetermined period of time.

15. A method of programming a multiple-button wireless transmitter that in an unsecured mode initiates a function controlled by a moveable barrier operator with a single button actuation and in a secured mode initiates a function controlled by a movable barrier operator with multiple button actuations, the method comprising:

learning the wireless transmitter to a movable barrier operator;

actuating at least two buttons of the transmitter simultaneously for a predetermined period of time;

releasing said actuated buttons;

actuating separately at least two buttons of the transmitter in a sequence and one of said at least two buttons to terminate said sequence; and actuating said buttons in said sequence to initiate the function controlled by the barrier operator.

16. The method according to claim 15, further comprising:

continually providing power to the transmitter.

* * * * *